(12) United States Patent
Buescher et al.

(10) Patent No.: US 12,448,803 B2
(45) Date of Patent: Oct. 21, 2025

(54) SELF-CONFIGURING IGNITION CONTROLS (71) Applicant: Copeland Comfort Control LP, St. Louis, MO (US)

(72) Inventors: Thomas P. Buescher, Webster Groves, MO (US); John F. Broker, Warrenton, MO (US); Donald R. Shaw, III, St. Louis, MO (US)

(73) Assignee: Copeland Comfort Control LP, St. Louis, MO (US)

( * ) Notice: Subject to any disclaimer, the term of this patent is extended or adjusted under 35 U.S.C. 154(b) by 308 days.

(21) Appl. No.: 18/234,717

(22) Filed: Aug. 16, 2023

(65) Prior Publication Data

US 2024/0060322 A1 Feb. 22, 2024

Related U.S. Application Data

(60) Provisional application No. 63/398,836, filed on Aug. 17, 2022.

(51) Int. Cl.
*E04H 4/12* (2006.01)
*F24H 1/00* (2022.01)
*F24H 1/54* (2022.01)

(52) U.S. Cl.
CPC ........... *E04H 4/129* (2013.01); *F24H 1/0054* (2013.01); *F24H 1/54* (2022.01)

(58) Field of Classification Search
CPC ......... E04H 4/129; F24H 1/0054; F24H 1/54; F24H 15/20

(Continued)

(56) References Cited

U.S. PATENT DOCUMENTS 3,291,119 A * 12/1966 Sullivan .................... F24D 3/02
 4/493
3,309,602 A * 3/1967 Euvino ................. H02M 1/083
 327/402

(Continued)

FOREIGN PATENT DOCUMENTS

CA 2524157 A1 * 4/2007 ............. E04H 4/129
CA 3136507 A1 * 4/2022 ............. F23D 14/64

(Continued)

OTHER PUBLICATIONS

Jandy® JXi™ Gas-Fired Pool and Spa Heater Installation and Operation Manual; Zodiac Pool Systems LLC; Copyright 2023; 64 pages; see for example p. 30.

(Continued)

*Primary Examiner* — Lori L Baker
(74) *Attorney, Agent, or Firm* — Harness, Dickey & Pierce, P.L.C.; Anthony G. Fussner (57) ABSTRACT

A control for a gas fired pool heater is configurable to operate at either a first voltage or a second voltage higher than the first voltage. The control includes an input voltage measurement circuit and an automatic voltage select circuit. The input voltage measurement circuit is configured to be operable for measuring an input line voltage to determine whether the gas fired pool heater unit is connected with the first voltage or the second voltage. The automatic voltage select circuit is configured to be operable for configuring the control for the correct input line voltage as measured by the input voltage measurement circuit.

23 Claims, 5 Drawing Sheets

(58) Field of Classification Search
USPC .............. 4/493, 488; 700/278, 282, 296
See application file for complete search history.

(56) References Cited

U.S. PATENT DOCUMENTS

| | | | | |
|---|---|---|---|---|
| 3,368,546 A * | 2/1968 | Wade | ............... | F24H 1/40 165/142 |
| 3,724,446 A * | 4/1973 | Richards | ............... | F24H 1/107 4/493 |
| 3,786,921 A * | 1/1974 | Johnson | ............... | E04H 4/129 210/130 |
| 3,837,016 A * | 9/1974 | Schindler | ............... | E04H 4/129 4/493 |
| 3,913,380 A * | 10/1975 | Jones | ............... | G01N 33/2817 73/35.02 |
| 3,949,595 A * | 4/1976 | Jones | ............... | F02M 63/00 73/864.81 |
| 3,999,709 A * | 12/1976 | Estabrook | ............... | F24D 3/08 237/19 |
| 4,044,551 A * | 8/1977 | Nelson | ............... | F02C 7/26 60/790 |
| 4,071,709 A * | 1/1978 | Lee | ............... | H04M 19/02 379/252 |
| 4,084,406 A * | 4/1978 | Brenneman | ............... | H02H 3/353 62/211 |
| 4,237,860 A * | 12/1980 | Caroon | ............... | F24S 10/10 126/564 |
| 4,241,400 A * | 12/1980 | Kiefer | ............... | G05B 19/0428 68/12.26 |
| 4,245,309 A * | 1/1981 | Kiefer | ............... | G05B 19/0428 68/12.26 |
| 4,245,310 A * | 1/1981 | Kiefer | ............... | D06F 33/47 68/12.23 |
| 4,265,371 A * | 5/1981 | Desai | ............... | G07F 13/065 222/639 |
| 4,292,813 A * | 10/1981 | Paddock | ............... | G05D 23/1913 236/46 F |
| 4,309,876 A * | 1/1982 | Leonard | ............... | F25B 49/022 62/175 |
| 4,344,027 A * | 8/1982 | Karlicek | ............... | H02J 3/14 322/97 |
| 4,385,724 A * | 5/1983 | Ramsauer | ............... | G05D 23/275 236/94 |
| 4,418,398 A * | 11/1983 | Hornung | ............... | G05B 19/0426 700/12 |
| 4,419,619 A * | 12/1983 | Jindrick | ............... | H02M 3/33515 323/263 |
| 4,481,786 A * | 11/1984 | Bashark | ............... | H02P 23/0077 318/438 |
| 4,529,033 A * | 7/1985 | Blum | ............... | F24H 1/54 165/47 |
| 4,621,613 A * | 11/1986 | Krumhansl | ............... | F24S 20/02 126/592 |
| 4,631,627 A * | 12/1986 | Morgan | ............... | H01H 9/56 361/186 |
| 4,679,545 A * | 7/1987 | Cavestany | ............... | F24H 1/54 126/379.1 |
| 4,680,446 A * | 7/1987 | Post | ............... | F24D 17/0089 122/13.3 |
| 4,813,396 A * | 3/1989 | Sargeant | ............... | F24H 1/0045 122/18.4 |
| 4,893,609 A * | 1/1990 | Giordani | ............... | F24H 1/40 126/307 R |
| 4,907,418 A * | 3/1990 | DeFazio | ............... | E04H 4/129 165/160 |
| 4,922,363 A * | 5/1990 | Long | ............... | H02H 7/222 361/146 |
| 5,205,133 A * | 4/1993 | Lackstrom | ............... | F25B 30/02 60/671 |
| 5,313,874 A * | 5/1994 | Lackstrom | ............... | F24H 4/00 60/671 |
| 5,318,007 A * | 6/1994 | Afshar | ............... | F24H 9/13 122/18.4 |
| 5,509,274 A * | 4/1996 | Lackstrom | ............... | F25B 27/00 62/238.4 |
| 5,606,964 A * | 3/1997 | Bussman | ............... | F24H 1/41 122/18.4 |
| 5,809,942 A * | 9/1998 | Kralovec | ............... | F24H 9/2007 4/493 |
| 6,145,139 A * | 11/2000 | Bonn | ............... | F24D 12/02 122/421 |
| 6,739,139 B1* | 5/2004 | Solomon | ............... | F02G 5/00 62/324.6 |
| 6,886,354 B2* | 5/2005 | Dudley | ............... | F04B 49/10 62/472 |
| 6,993,418 B2* | 1/2006 | Stewart | ............... | G05D 23/1931 700/79 |
| 7,236,692 B2* | 6/2007 | Tran | ............... | H05B 1/0269 392/318 |
| 8,014,902 B2* | 9/2011 | Kates | ............... | H02J 3/14 700/282 |
| 8,095,081 B2* | 1/2012 | Vance | ............... | H04B 1/46 704/271 |
| 8,107,803 B1* | 1/2012 | Hannah | ............... | A47J 31/4403 392/494 |
| 9,638,446 B2* | 5/2017 | Kleinow | ............... | F25B 49/005 |
| 10,209,751 B2* | 2/2019 | Zikes | ............... | H01H 47/32 |
| 10,365,013 B1* | 7/2019 | Wieckowski | ............... | F24H 9/1818 |
| 11,402,128 B2* | 8/2022 | Buescher | ............... | F24H 1/08 |
| 11,649,650 B2* | 5/2023 | Corn | ............... | F24H 1/145 4/493 |
| 12,188,255 B2* | 1/2025 | Corn | ............... | A61H 33/063 |
| 2003/0168516 A1* | 9/2003 | Cline | ............... | E04H 4/129 237/2 A |
| 2005/0245203 A1* | 11/2005 | Vance | ............... | H04L 65/4061 455/78 |
| 2006/0115248 A1* | 6/2006 | Tran | ............... | H05B 1/0269 392/488 |
| 2008/0010736 A1* | 1/2008 | Hubbard | ............... | E04H 4/129 4/493 |
| 2009/0211986 A1* | 8/2009 | Kates | ............... | E04H 4/129 210/742 |
| 2010/0290763 A1* | 11/2010 | Boulay | ............... | F24H 15/164 219/494 |
| 2011/0265779 A1* | 11/2011 | Vandrak | ............... | F24H 9/06 126/93 |
| 2012/0042445 A1* | 2/2012 | Mc Queen | ............... | F24H 15/325 126/357.1 |
| 2012/0057857 A1* | 3/2012 | Kenney | ............... | H05B 1/0244 219/494 |
| 2013/0269096 A1* | 10/2013 | Pleva | ............... | E04H 4/129 4/493 |
| 2014/0308138 A1* | 10/2014 | Pham | ............... | F04B 49/02 417/63 |
| 2015/0260428 A1* | 9/2015 | Haldeman | ............... | F24H 1/142 4/493 |
| 2015/0368921 A1* | 12/2015 | Dzindo | ............... | F24H 9/139 62/238.7 |
| 2016/0061500 A1* | 3/2016 | Kleinow | ............... | F25B 49/005 62/56 |
| 2016/0076542 A1* | 3/2016 | Pham | ............... | F04C 28/06 417/12 |
| 2016/0245546 A1* | 8/2016 | Mihu | ............... | F24H 9/2028 |
| 2017/0307256 A1* | 10/2017 | Broker | ............... | F24H 15/36 |
| 2020/0194205 A1* | 6/2020 | Buescher | ............... | H01H 50/02 |
| 2021/0108827 A1* | 4/2021 | Glass | ............... | F24H 9/20 |
| 2021/0172657 A1* | 6/2021 | Bernardi | ............... | F28F 1/426 |
| 2021/0190372 A1* | 6/2021 | Montanez | ............... | F24H 15/144 |
| 2021/0333026 A1* | 10/2021 | Buescher | ............... | F25B 49/022 |
| 2022/0082288 A1* | 3/2022 | Revilla | ............... | F24H 1/145 |
| 2022/0136269 A1* | 5/2022 | Roy | ............... | F23D 14/36 4/493 |
| 2022/0316823 A1* | 10/2022 | Do | ............... | C23C 18/1637 |
| 2022/0364805 A1* | 11/2022 | Monfared | ............... | F28F 27/02 |
| 2023/0090852 A1* | 3/2023 | Roy | ............... | E04H 4/129 4/493 |
| 2023/0144546 A1* | 5/2023 | Potucek | ............... | A61H 33/0095 700/282 |
| 2023/0366596 A1* | 11/2023 | Buescher | ............... | F25B 49/022 |

(56) References Cited

U.S. PATENT DOCUMENTS

| | | | |
|---|---|---|---|
| 2024/0060322 A1* | 2/2024 | Buescher | F24H 1/54 |
| 2024/0271442 A1* | 8/2024 | Valencia | E04H 4/129 |
| 2025/0164114 A1* | 5/2025 | Vaughn | F04D 27/004 |
| 2025/0180027 A1* | 6/2025 | Sgambelluri | F04D 13/08 |

FOREIGN PATENT DOCUMENTS

| | | | | |
|---|---|---|---|---|
| EP | 1063481 A2 | * | 12/2000 | F24H 9/2035 |
| HU | 219071 B | * | 2/2001 | F24H 1/107 |
| WO | WO-2024112817 A1 | * | 5/2024 | F24H 9/2028 |

OTHER PUBLICATIONS

Jandy® Installation and Operation Manual; Jandy Pro Series Hi-E2® and Hi-E2® Gas-Fired Pool and Spa Heater EHE; Copyright 2017; Zodiac Pool Systems, Inc., 40 pages.

Pentair Mastertemp® Pool and Spa Heater Installation and User's Guide; Copyright 2020 Pentair Inc.; 66 pages; see for example pp. 34 and 40.

Fenwal® Ignition 101; Gas Ignition Systems; www.fenwalcontrols.com; Copyright 2005; 7 pages.

In Ground Pool/Spa Gas Heaters Installation & Operations Manual; Accessed Jul. 25, 2023; 57 pages; see for example p. 6.

\* cited by examiner

SELF-CONFIGURING IGNITION CONTROLS

FIELD

This application claims the benefit and priority of U.S. Provisional Application No. 63/398,836 filed Aug. 17, 2022, which is incorporated herein by reference in its entirety.

The present disclosure relates to self-configuring ignition controls or control modules (e.g., 120V/240V automatic self-configuring combined ignition and pool control for gas fired pool heating equipment, etc.).

BACKGROUND

This section provides background information related to the present disclosure which is not necessarily prior art.

Some commercial and residential heating equipment are configurable to operate at either 120V or 240V depending on the service available at the installation site. For example, pool heating equipment may be configurable between 120V and 240V as the pool heating equipment will be co-located with a pump. In which case, the pump's voltage will be dependent on the size of the pool to be heated, e.g., larger pools will have 240V at the mechanicals and heater.

Figure 1:
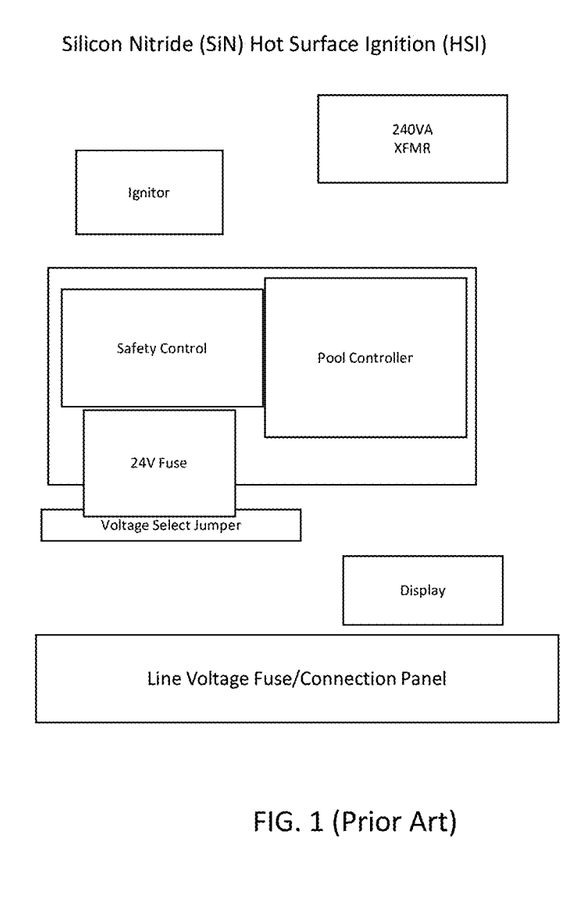
FIG. 1 is a block diagram illustrating a conventional silicon nitride (SiN) hot surface ignition (HSI) system for a gas fired pool heater.

FIG. 1 illustrates a conventional silicon nitride (SiN) hot surface ignition (HSI) system for a gas fired pool heater. This conventional silicon nitride hot surface ignition system is configured to be operable with a dual voltage method including the use of a relatively large 240VA transformer (XFRM) (240VA split primary/24V and 120V secondary) and a two-speed fan for ignition without a dual voltage silicon nitride ignitor. The silicon nitride ignitor with input voltage regulation requires 120V input. The fan and ignitor run at 120V via the large 240VA transformer XFRM. Due to the relatively expensive large transformer and potential for an incorrect voltage jumper selection, this conventional system includes a fuse wiring board having three fuses for the line voltage to protect the relatively expensive transformer in addition to a 24V fuse. By comparison, other conventional hot surface ignition systems do not include line voltage fuses. The transformer is configured with a 240VA split primary/24V and 120V secondary.

Figure 2:
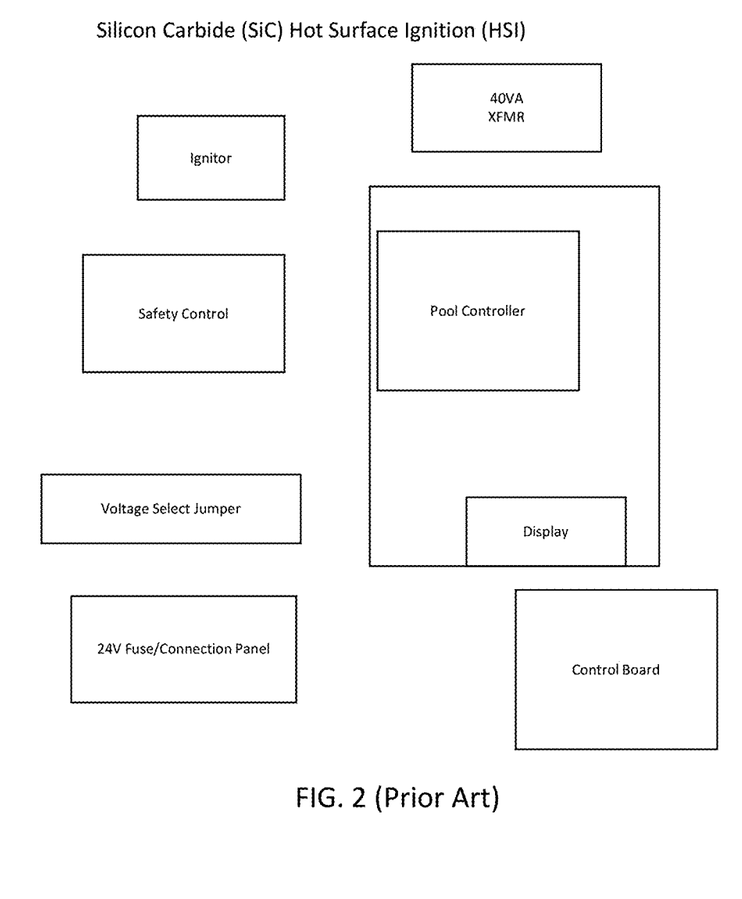
FIG. 2 is a block diagram illustrating a conventional silicon carbide (SiC) hot surface ignition (HSI) system for a gas fired pool heater.

FIG. 2 illustrates another conventional silicon carbide (SiC) hot surface ignition (HSI) system for a gas fired pool heater. This conventional silicon carbide hot is configured to be operable with a dual voltage method including the use of a relatively high energy ignitor for good ignition and a single speed dual voltage winding blower. The system includes a backward compatible gas fired control board with an integrated display, an ignition control module, a dual winding blower, a 30VA 24V transformer, a single fuse on a fireman switch (24V), and a two wire input 120V or 240V that requires a harness voltage selection.

Figure 3:
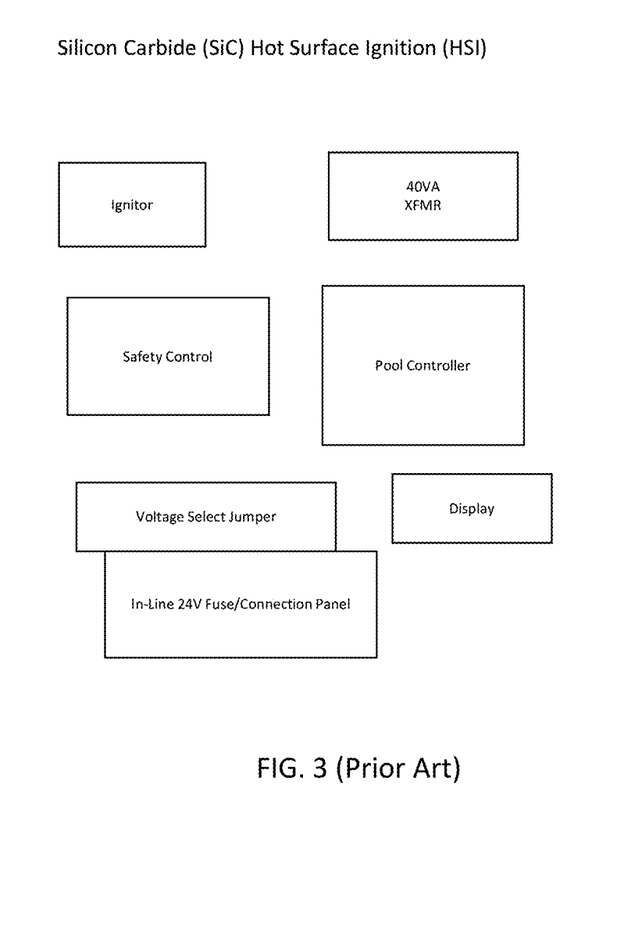
FIG. 3 is a block diagram illustrating another conventional silicon carbide (SiC) hot surface ignition (HSI) system for a gas fired pool heater.

FIG. 3 illustrates a further conventional silicon carbide (SiC) hot surface ignition (HSI) system for a gas fired pool heater. This conventional silicon carbide hot surface ignition system is configured to be operable with a dual voltage method including the use of a relatively high energy ignitor for good ignition and a single speed dual voltage winding blower. The system includes a dual purpose control board for heat pump/gas heater, a 120V/240V ignition control module, a dual winding blower, and a two wire input 120V or 240V that requires a PCB/edge connector jumper for 120V/240V.

DRAWINGS

The drawings described herein are for illustrative purposes only of selected embodiments and not all possible implementations, and are not intended to limit the scope of the present disclosure.

Corresponding reference numerals may indicate corresponding (though not necessarily identical) parts throughout the several views of the drawings.

DETAILED DESCRIPTION

Example embodiments will now be described more fully with reference to the accompanying drawings.

As noted above, pool heating equipment may be configurable between 120V and 240V as the pool heating equipment will be co-located with a pump. And the pump's voltage will be dependent on the size of the pool to be heated, e.g., larger pools will have 240V at the mechanicals and heater. Conventional pool heaters must be manually configured by the installer or technician selecting the correct jumper connector based on the voltage. See, for example, the voltage select jumpers shown in FIGS. 1, 2, and 3. But as recognized herein, the failure to choose the correct jumper connector for the pool heater will result in blown fuses or damaged components.

The operation of a conventional pool heater may be controlled by a control that is configured to drive a 120V ignitor either directly at 120V or wave chopped at 240V. The conventional control may also be used to drive a dual winding fan. But as recognized herein, the wiring for both a 120V ignitor and a dual winding fan must be adapted using a multi-pin connector based jumper specific to the incoming voltage level.

After recognizing the above, exemplary embodiments were developed and/or are disclosed herein of self-configuring ignition controls or control modules (e.g., 120V/240V automatic self-configuring combined ignition and pool control for gas fired pool heating equipment, etc.) and systems including the same. In exemplary embodiments, a combined ignition/pool controller is configured to be operable to automatically self-configure itself based on the voltage connected. Advantageously, the automatic self-configuring features may simplify installation and wiring at a similar or lower cost as compared to a conventional system in which the technician or installer must manually select the correct jumper connector based on the voltage.

Unlike conventional systems that require the technician or installer to properly select the correct voltage for proper operation and to prevent system damage, exemplary embodiments disclosed herein are configured to be operable for automatically self-selecting the correct voltage level and to indicate (e.g., generate an alert or warning, etc.) if something is amiss. In addition, conventional systems use multiple wire harnesses, large voltage selection connectors (e.g., FIGS. 1, 2, 3, etc.), fuse boards, and/or large transformers (e.g., 240VA XFRM in FIG. 1, etc.) to manage the voltage selection. In exemplary embodiments disclosed herein, the system includes two circuit board mounted relays and is configured for automatic voltage selection thereby eliminating the need for multiple wire harnesses, large voltage selection connectors, fuse boards, and large transformers. By eliminating the multiple wire harnesses, large voltage selection connectors, fuse boards, and large transformers that are conventionally used to manage the manual voltage selection, exemplary embodiments disclosed herein may allow for reduced production labor costs.

In exemplary embodiments, the control (e.g., combined ignition/pool control 204 (FIG. 5), etc.) is configured to include and use a circuit to measure the input voltage level (e.g., input voltage measurement circuit 254 in FIG. 5, etc.) to determine if the heater unit is connected to 120V service or 240V service. Line voltage is typically used for four things in ignition controls, specifically: (1) supplying a low voltage power supply (e.g., to a wide range of switched mode power supplies (SMPS), etc.); (2) driving a flame rectification sensor; (3) driving a hot surface ignitor; and (4) driving an inducer fan for the burner.

In exemplary embodiments disclosed herein, a combined ignition and pool control is configured such that the line voltage supplies a low voltage power supply to an inducer fan control relay (e.g., single pull single throw (SPST) G5Q PCB power relay, etc.) and a transformer (XFRM). The line voltage is also used for driving a flame sense or flame sense rectification sensor, a hot surface ignitor, and an inducer fan for the burner.

Transformer voltage output from an XFRM connector is configured (e.g., automatically routed without manual input, etc.) by an XFRM voltage select relay (e.g., double pole double throw (DPDT) surface mount technology (SMT) latching relay, etc.) based on the measured input line voltage by an input voltage measurement circuit. The XFRM voltage select relay (e.g., latching DPDT relay, etc.) ensures that two secondary 24V coils are arranged in a way to supply 24V. If 120V input line voltage is measured or sensed by the input voltage measurement circuit, the control configures or arranges the secondary 24V coils in parallel. But if 240V input line voltage is measured or sensed by the input voltage measurement circuit, the control configures or arranges the secondary 24V coils in series. The 24 VAC output is confirmed by a low voltage measurement circuit. The same concept may also be applied to the primary side of the transformer though the XFRM voltage select relay (e.g., latching DPDT relay, etc.) may be smaller and lower cost by switching the low voltage levels. The controller voltage level (e.g., microcontroller voltage level, etc.) will be tolerant of any combination of input voltage or relay position, and the XFRM voltage select relay will be driven from the controller voltage level to allow the system to reconfigure if the system is in an incorrect configuration at startup.

In exemplary embodiments, the combined ignition and pool control is configured such that the thresholds of the flame sense are configured or modified to account for the different input voltage. This may be accomplished by using analog circuits in hardware or changing thresholds in software. In 240V residential configurations in which both L1 and L2 are 120V to ground, no changes to the flame sense thresholds are needed. But for 120V residential configurations, polarity is determined for the line voltage input supplying the flame sense circuit.

In exemplary embodiments, the combined ignition and pool control includes an ignitor circuit configured to modulate the effective RMS power to the ignitor using a triac (e.g., ignitor triac wave chopper, etc.) to remove a section of each half cycle. The amount of on/off time for the triac may be determined via a lookup table based upon input voltage level.

In exemplary embodiments, the combined ignition and pool control includes an inducer fan circuit that uses a voltage routing double pull double throw (DPDT) relay that is located after the single pull single throw (SPST) inducer fan control relay. The voltage routing relay is electrically connected with the inducer fan control relay, an ignitor triac wave chopper, the input voltage line, and a fan connector. In this example, the normally closed contact of the voltage routing DPDT relay is configured to route 240V voltage level. But if 120V input voltage is sensed or measured by the input voltage measurement circuit, the voltage routing DPDT relay is energized to route the inducer fan for 120V operation prior to energizing the inducer fan control relay.

Figure 4:
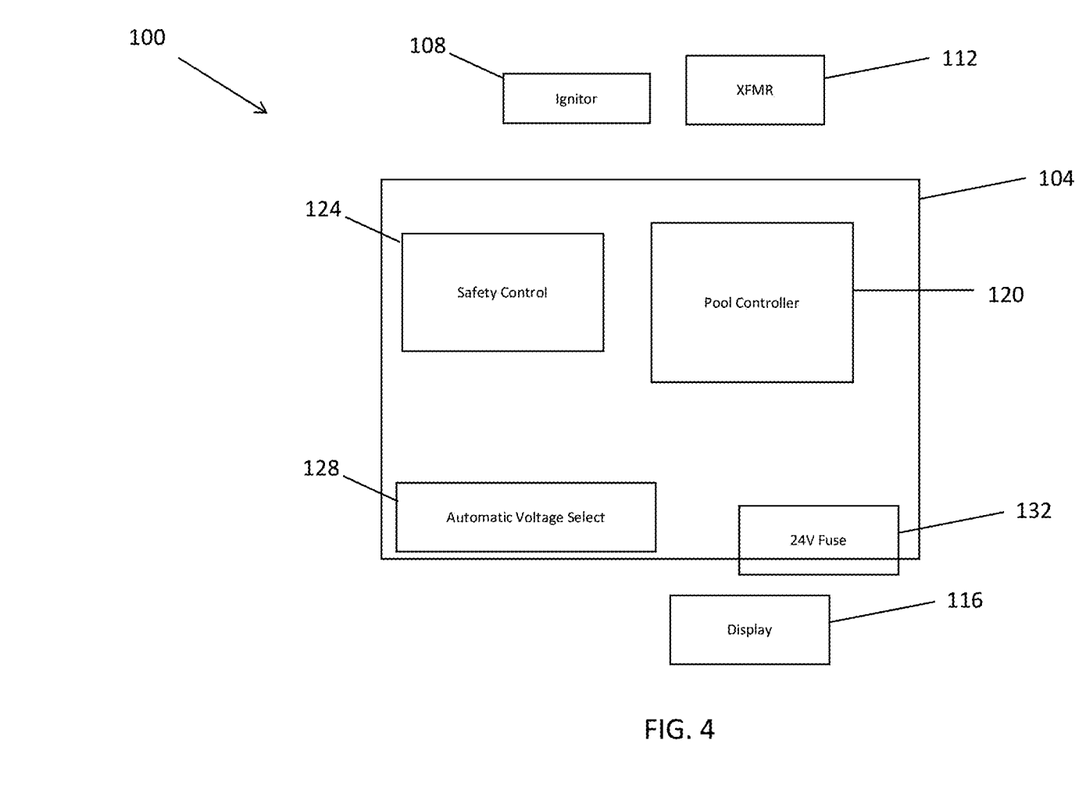
FIG. 4 is a block diagram of a hot surface ignition (HSI) system for a gas fired pool heater according to an exemplary embodiment of the present disclosure.

FIG. 4 illustrates an exemplary embodiment of a hot surface ignition (HSI) system 100 for a gas fired pool heater that embodies one or more aspects of the present disclosure. The system 100 generally includes a self-configuring combined ignition/pool control 104, an ignitor 108, a transformer (Xfrm) 112, and a display 116 (broadly, user interface). By way of example, a user may access the user interface including the display 116 to increase or decrease a temperature setpoint of the gas fired pool heater.

The control 104 includes a pool controller 120, a safety control 124, an automatic voltage select 128, and a 24V fuse 132. The control 104 is configured to be operable for determining (e.g., via an input voltage measurement circuit, etc.) line input voltage level (e.g., 120V, 240V, etc.), e.g., to thereby determine if the pool heater unit is connected to 120V service or 240V service. The control 104 includes the automatic voltage select circuit or module 128 instead of a manual voltage select jumper that is included in the conventional systems shown in FIGS. 1, 2, and 3. Accordingly, the automatic voltage select circuit or module 128 enables the control 104 to be self-configuring (e.g., automatically configuring itself without manual input, automatically routing as needed, etc.) depending on the determined input voltage level. The system 100 is configured to be operable with a dual voltage method using either type of ignitor (i.e., a silicon nitride (SiN) type of ignitor and a silicon carbide (SiC) type of ignitor) and a single speed dual winding blower.

Figure 5:
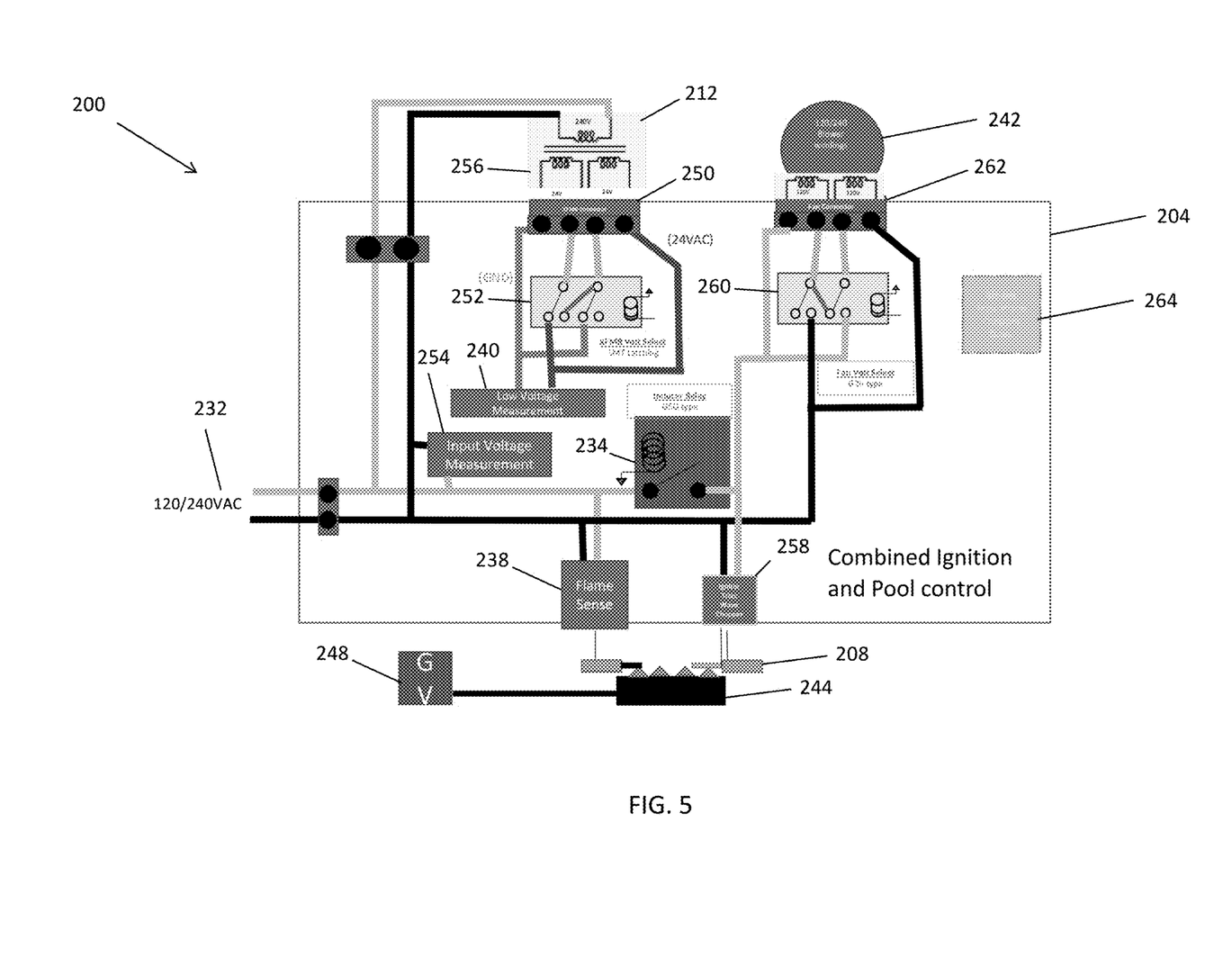
FIG. 5 is a wiring diagram for a self-configuring combined ignition/pool controller for a gas fired pool heater according to an exemplary embodiment of the present disclosure.

FIG. 5 illustrates a self-configuring combined ignition/pool controller 204 for a hot surface ignition (HSI) system 200 for a gas fired pool heater that embodies one or more aspects of the present disclosure. An automatic voltage selection is integrated into the self-configuring combined ignition/pool control 204. Generally, FIG. 5 illustrates or details circuits that are modified and/or that are non-existent in the conventional hot surface ignition systems shown in FIGS. 1, 2, and 3.

In the exemplary embodiment shown in FIG. 5, the combined ignition and pool control 204 is configured such that the line voltage 232 supplies a low voltage power supply to the inducer fan control relay 234 (e.g., single pull single throw (SPST) G5Q PCB power relay, etc.) and a transformer (XFRM) 212. The line voltage 232 is also used for driving a flame sense or flame sense rectification sensor 238, a hot surface ignitor 208, and an inducer fan 242 for the burner 244. The burner 244 is coupled with the gas valve 248.

Transformer voltage output from a transformer (XFRM) connector 250 is configured (e.g., automatically routed without manual input, etc.) by an XFRM voltage select relay 252 (e.g., double pole double throw (DPDT) surface mount technology (SMT) latching relay, other suitable relay, etc.) based on the measured input line voltage by an input voltage measurement circuit 254.

The XFRM voltage select relay 252 (e.g., latching DPDT relay, etc.) ensures that two secondary 24V coils 256 are arranged in a way to supply 24V. If 120V input line voltage is measured or sensed by the input voltage measurement circuit 254, the control 204 configures or arranges the secondary 24V coils 256 in parallel. But if 240V input line voltage is measured or sensed by the input voltage measurement circuit 254, the control 204 configures or arranges the secondary 24V coils 256 in series. The 24 VAC output 252 is confirmed by the low voltage measurement circuit 240. The same concept may also be applied to the primary side of the transformer 212 though the relay 252 may be smaller and lower cost by switching the low voltage levels. The controller voltage level (e.g., microcontroller voltage level, etc.) will be tolerant of any combination of input voltage or relay position, and the relay 252 will be driven from the controller voltage level to allow the system 200 to reconfigure if in the wrong configuration or setup at startup.

The thresholds of the flame sense 238 are configured or modified to account for the different input voltage. This may be accomplished by using analog circuits in hardware or changing thresholds in software. For example, in 240V residential configurations in which both L1 and L2 are 120V to ground, no changes to the flame sense thresholds are needed. But for 120V residential configurations, polarity is determined for the line voltage input supplying the flame sense circuit.

The control 204 includes an ignitor circuit configured to modulate the effective RMS power to the ignitor 208 using a triac 258 (e.g., ignitor triac wave chopper, etc.) to remove a section of each half cycle. The amount of on/off time for the triac 258 may be determined via a lookup table based upon input voltage level.

The control 204 includes an inducer fan circuit that uses a voltage routing double pull double throw (DPDT) relay 260 that is located after the single pull single throw (SPST) inducer fan control relay 234. The voltage routing relay 260 is electrically connected with the inducer fan control relay 234, ignitor triac wave chopper 258, input voltage line 232, and a fan connector 262. In this example, the normally closed contact of the voltage routing DPDT relay 260 is configured to route 240V voltage level. But if 120V input voltage is sensed or measured by the input voltage measurement circuit 252, the voltage routing DPDT relay 260 is energized to route the inducer fan 242 for 120V operation prior to energizing the fan control relay 234.

Also shown in FIG. 5 is a blower triac wave chopper drive 264 that may be operable for removing a section of each half cycle. The amount of on/off time for the blower triac wave chopper drive 264 may be determined vi a lookup table based upon input voltage level.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A control for a gas fired pool heater that is configurable to operate at either a first voltage or a second voltage higher than the first voltage, the control comprising:
   an input voltage measurement circuit configured to be operable for measuring an input line voltage to determine whether the gas fired pool heater is connected with the first voltage or the second voltage; and
   an automatic voltage select circuit configured to be operable for configuring the control for the correct input line voltage as measured by the input voltage measurement circuit.

2. The control of claim 1, wherein the control is configured to be operable for automatically self-configuring itself for the correct input line voltage as measured by the input voltage measurement circuit.

3. The control of claim 2, wherein the control is configured to be operable for automatically self-configuring itself for the correct input line voltage as measured by the input voltage measurement circuit without requiring manual input, without requiring a manual harness voltage selection and without requiring a PCB/edge connector jumper for the first and second voltages.

4. The control of claim 1, wherein the control is configured to be operable for automatically routing a voltage output from a transformer of the gas fired pool heater based on the input line voltage as measured by the input voltage measurement circuit.

5. The control of claim 1, wherein:
   the control is operable with a gas fired pool heater configurable to operate at either 120V or 240V;
   the input voltage measurement circuit is operable for measuring input voltage level to determine whether the gas fired pool heater is connected with 120V service or 240V service; and
   the automatic voltage select circuit is configured to be operable for automatically self-configuring the control correctly for the 120V service or 240V service based on the input line voltage as measured by the input voltage measurement circuit.

6. The control of claim 1, wherein the control includes a transformer connector and a transformer voltage select relay, and wherein:
   the transformer connector and the input voltage measurement circuit are configured for connection with the transformer of the gas fired pool heater; and
   the transformer voltage select relay is coupled with the transformer connector and the input voltage measurement circuit, the transformer voltage select relay operable for configuring transformer voltage output from the transformer connector based on the input line voltage as measured by the input voltage measurement circuit.

7. The control of claim 6, wherein the control is configured such that the transformer voltage output from the transformer connector is automatically routed by the transformer voltage select relay based on the input line voltage as measured by the input voltage measurement circuit.

8. The control of claim 7, wherein the control is configured such that the transformer voltage select relay is operable for automatically arranging two secondary 24V coils of the transformer of the gas fired pool heater:
   in parallel when 120V input line voltage is measured by the input voltage measurement circuit; and
   in series when 240V input line voltage is measured by the input voltage measurement circuit.

9. The control of claim 8, wherein the control includes a low voltage measurement circuit configured to confirm a 24 VAC output of the two secondary 24V coils of the transformer of the gas fired pool heater.

10. The control of claim 6, wherein the transformer voltage select relay is configured to be driven from the control voltage level thereby allowing for automatic self-reconfiguration when there is an incorrect configuration at startup.

11. The control of claim 1, wherein the control is configured to be operable for automatically self-selecting a correct voltage level for the gas fired pool heater without manual intervention and to indicate when something is amiss including when there is an incorrect configuration at startup.

12. The control of claim 11, wherein the control is configured to generate an alert or warning when something is amiss including when there is an incorrect configuration at startup.

13. The control of claim 1, wherein:
the gas fired pool heater comprises a burner coupled with a gas valve, a hot surface ignitor, an inducer fan for the burner, and a transformer;
the control comprises an inducer fan control relay and a flame sense;
the control is configured such that the input line voltage is operable for:
supplying a voltage power supply to the inducer fan control relay and to the transformer of the gas fired pool heater; and
driving the flame sense, the hot surface ignitor, and the inducer fan for the burner.

14. The control of claim 1, wherein:
the control includes a flame sense; and
the control is configured such that thresholds of the flame sense are configured to account for different input voltages.

15. The control of claim 1, wherein:
the control includes an ignitor circuit and a triac; and
the ignitor circuit is configured to modulate an effective RMS power to an ignitor of the gas fired pool heater by using the triac to remove a section of each half cycle, whereby an amount of on/off time for the triac is determinable via a lookup table based upon the input voltage level.

16. The control of claim 1, wherein the control includes:
a fan connector configured for connection with an inducer fan for a burner of the gas fired pool heater;
an inducer fan control relay electrically connected with the fan connector and the input voltage measurement circuit;
an ignitor triac wave chopper configured for connection with an ignitor of the gas fired pool heater; and
an inducer fan circuit including a voltage routing relay, the voltage routing relay is coupled with the inducer fan control relay, the ignitor triac wave chopper, an input voltage line, and the fan connector.

17. The control of claim 16, wherein the control is configured such that:
when 240V input line voltage is measured by the input voltage measurement circuit, a normally closed contact of the voltage routing relay is configured to route 240V voltage level; and
when 120V input line voltage is measured by the input voltage measurement circuit, the voltage routing relay is energized to route the inducer fan for 120V operation prior to energizing the inducer fan control relay.

18. The control of claim 1, wherein the control is a 120V/240V automatic self-configuring combined ignition and pool controller for a hot surface ignition (HSI) system.

19. A hot surface ignition (HSI) system for a gas fired pool heater, the hot surface ignition system comprising the control of claim 1.

20. A gas fired pool heater comprising the control of claim 1, wherein the control includes a user interface including a display that allows a user to increase or decrease a temperature setpoint of the gas fired pool heater.

21. A method for automatically self-configuring a control for a gas fired pool heater that is configurable to operate at either a first voltage or a second voltage higher than the first voltage, the method comprising:
measuring an input line voltage via an input voltage measurement circuit to determine whether the gas fired pool heater is connected with the first voltage or the second voltage; and
automatically self-configuring the control via an automatic voltage select circuit for the correct input line voltage as measured by the input voltage measurement circuit.

22. The method of claim 21, wherein the method includes automatically self-configuring the control via the automatic voltage select circuit without manual input to select the correct input line voltage.

23. The method of claim 21, wherein the method includes automatically self-configuring the control via the automatic voltage select circuit for the correct input line voltage as measured by the input voltage measurement circuit without requiring a manual harness voltage selection, without requiring a PCB/edge connector jumper for the first and second voltages, and without requiring an installer or technician to manually select a correct multi-pin connector based jumper for the gas fired pool heated based on the specific incoming voltage level.

* * * * *